Patented Dec. 1, 1953

2,661,347

UNITED STATES PATENT OFFICE 2,661,347

STABILIZED ACRYLONITRILE POLYMERS

George L. Wesp, Englewood, and Robert J. Slocombe, Dayton, Ohio, assignors to Monsanto Chemical Company, St. Louis, Mo., a corporation of Delaware No Drawing. Application October 26, 1950, Serial No. 192,346

6 Claims. (Cl. 260—45.85)

This invention relates to methods of preparing polymers of acrylonitrile which are stabilized with respect to thermodiscoloration. More specifically the invention relates to methods of converting unstable polymers of acrylonitrile into color stable polymers.

Although polyacrylonitrile and copolymers of 50 per cent or more by weight of acrylonitrile and other monomers containing olefinic unsaturation copolymerized therewith, are generally regarded as being materials of good thermostability, they are subject to discoloration. This phenomenon generally results because of the need for extruding and molding the composition at elevated temperatures. Furthermore, the higher acrylonitrile polymers find extensive use in the fabrication of fibers, films and fabrics which frequently are subjected to ironing operations at elevated temperatures. Thus, serious discolorations are often developed in the fabrication and processing of acrylonitrile polymers.

The primary purpose of this invention is to provide color stable polymers of acrylonitrile. A further purpose of the invention is to facilitate molding and other processing procedures without the danger of the deterioration of fibers and other forms usually encountered at elevated temperatures. A still further purpose of the invention is to provide substances which can be added to conventional polymers to induce resistance to heat and discoloration.

It has been discovered that by adding maleic acid and the anhydride to acrylonitrile polymers improved resistance to discoloration may readily be developed. The nature of the chemical reaction involved is not definitely understood, but it is believed that the color change is due to some impurities present in the polymer. It may be that the maleate radicals react with the impurity to form a substance which is more heat stable than the impurity in its original form. Since not all maleic acid derivatives produce the same degree of beneficial effect the phenomena apparently involve additional stabilization by the metal as well as the acid portion of the compound. The total stabilization may involve additive or synergistic effects. Irrespective of the mechanism, it has been found that a very wide variety of maleic acid derivatives produces the desired effect.

The acrylonitrile polymers with which this invention may be practiced include polyacrylonitrile and copolymers of from 20 or more per cent acrylonitrile and up to 80 per cent of one or more of a wide variety of other unsaturated substances known to be copolymerizable with the acrylonitrile. Thus, the invention is practicable with the well-known fiber forming copolymers of acrylonitrile, which may be the copolymers of 75 per cent or more per cent of acrylonitrile and up to 25 per cent of other monomers. Other copolymers of from 25 per cent to 75 per cent acrylonitrile and 75 to 25 per cent of the various other monomers, which copolymers have primary utility in the field of film and molding composition production, are also useful.

The said other monomers with which the acrylonitrile may be copolymerized to produce resinous substances capable of use in the practice of this invention include vinyl acetate and other vinyl esters of monocarboxylic acids having up to four carbon atoms in the carboxylic acid radical, dimethyl maleate and dimethyl fumarate and other alkyl esters of fumaric and maleic acids, wherein the alkyl radical has up to four carbon atoms, methyl methacrylate or acrylate and other alkyl acrylates and alkyl methacrylates wherein the alkyl radical has up to four carbon atoms, vinyl chloride and other vinyl halides, styrene, alpha-methylstyrene and other vinyl and isopropenyl substituted aromatic hydrocarbons, methacrylonitrile, vinylidene chloride, vinylpyridine, the vinyl derivatives of other alkyl substituted pyridines, and the vinyl derivatives of other compounds containing a tertiary amino atom in a heterocyclic ring, vinylchloroacetate and other vinyl esters of haloacetic acids, methallyl chloroacetate, allyl chloroacetate and chloroallylchloroacetate, and the corresponding esters of other haloacetic esters, vinylimidazole and other N-vinyl derivatives of heterocyclic nitrogen compounds, and one or more of these and other unsaturated compounds known to be copolymerizable with acrylonitrile.

The maleic acid derivatives useful in the practice of this invention are maleic acid and maleic anhydride. In the practice of this invention the stabilizer may be used to the extent of 0.01 per cent to ten per cent by weight of the acrylonitrile polymer to be stabilized. Preferred practice of this invention involves the use of 0.1 per cent to three per cent of the stabilizer.

The invention may be practiced by combining the acrylonitrile polymer and the maleic acid or derivative thereof by a wide variety of mechanical procedures. Thus, the polymer may be treated in granular solid form and mixed physically with the compound or an aqueous or other liquid solution or dispersion of the compound.

The physical mixture may take place at room temperature or at higher temperatures, for example the temperature at which the polymer is semi-solid or fluid. A preferred practice involves the use of solvents or plasticizers for the acrylonitrile polymers in the presence of which the intimate dispersing of the stabilizing additive and the acrylonitrile polymer is more readily effected. The nature of the solvent which is useful in dissolving or softening the acrylonitrile polymer will to a large extent depend upon the chemical composition of the acrylonitrile polymers.

The copolymers of 75 per cent or more of acrylonitrile and up to 25 per cent of the comonomer are well-known fiber forming compositions and are generally resistant to the effect of most chemical solvents. In the preparation of solutions of such copolymers, solvents, such as N,N-dimethylformamide, N,N-dimethylacetamide, gamma-butyrolactone, ethylene carbonate, maleic acid, alpha-cyanoacetamide, and tris(dimethylamido)phosphate may be used.

In the treatment of the more soluble types of acrylonitrile polymers, for example those of from 20 per cent to 75 per cent acrylonitrile and from 25 per cent to 80 per cent of other monomers copolymerizable therewith, the selection of a solvent is less critical. This type of copolymer may be dissolved or otherwise physically affected by the various ketones, esters and aromatic hydrocarbon types of solvents. In general, the copolymer is placed in a suitable solution, or softened and swelled by the selected medium so as to enable a more ready dispersion of the maleic acid or derivative thereof within the solid polymer. Obviously a solvent which is also capable of dissolving at least to some extent the maleic acid or derivative thereof to be used will be exceptionally beneficial. However, the selection of the dispersing agent, the stabilizing agent and the particular method of dispersing the compound in the solid polymer is a matter readily determined by one skilled in the art.

To evaluate the stabilizing action of various compounds, acrylonitrile polymers of different chemical and physical properties were used and the compound dispersed therein by a variety of methods.

*Example*

Polyacrylonitrile was stabilized by dissolving it in N,N-dimethylformamide and adding to separate solutions two per cent of each of the various compounds in the table below. Films were prepared therefrom and tested to determine the light transmission properties by photoelectric methods. The transmission values set forth in the table below were measured after forty minutes and three hour periods of exposure at a temperature of 180° C. The ratings are expressed in the percentage of the transmission in excess of the transmission through a sample of the identical polymer not containing the stabilizing agent using a 410 millimicron filter in the photometer.

| | | |
|---|---|---|
| Maleic acid | +36.3 | +11.1 |
| Maleic anhydride | +29.8 | + 1.0 |

What we claim is:

1. A stable polyacrylonitrile polymer comprising a polymer of 20 per cent to 100 per cent of acrylonitrile and from up to 80 per cent of another monoolefinic monomer copolymerizable therewith, said polymer containing intimately dispersed therein as the sole stabilizing agent from 0.01 to ten per cent of a compound of the group consisting of maleic acid and maleic anhydride.

2. A stable polyacrylonitrile polymer comprising a polymer of 20 per cent to 100 per cent of acrylonitrile and from up to 80 per cent of another mono-olefinic monomer copolymerizable therewith, said polymer containing intimately dispersed therein as the sole stabilizing agent from 0.1 to three per cent of a compound of the group consisting of maleic acid and maleic anhydride.

3. A stable acrylonitrile polymer comprising a polymer of 20% to 100% of acrylonitrile and up to 80% of another monoolefinic monomer copolymerizable therewith, said polymer containing intimately dispersed therein from 0.01% to 10% by weight of maleic anhydride.

4. The stable polymer of claim 1 wherein the dispersed compound is maleic acid.

5. A stable acrylonitrile polymer comprising a polymer of 20% to 100% of acrylonitrile and up to 80% of another monoolefinic monomer copolymerizable therewith, said polymer containing intimately dispersed therein from 0.01% to 3% by weight of maleic anhydride.

6. A stable acrylonitrile polymer comprising a polymer of 20% to 100% of acrylonitrile and up to 80% of another monoolefinic monomer copolymerizable therewith, said polymer containing intimately dispersed therein from 0.01% to 3% by weight of maleic acid.

GEORGE L. WESP.
ROBERT J. SLOCOMBE.

References Cited in the file of this patent

UNITED STATES PATENTS

| Number | Name | Date |
|---|---|---|
| 2,507,142 | Chaban | May 9, 1950 |